United States Patent [19]

Sauer et al.

[11] 4,111,045
[45] Sep. 5, 1978

[54] AIR FLOW METER

[75] Inventors: Rudolf Sauer, Bernhausen; Dieter Vogt, Korntal-Münchingen, both of Fed. Rep. of Germany

[73] Assignee: Robert Bosch GmbH, Stuttgart, Fed. Rep. of Germany

[21] Appl. No.: 823,788

[22] Filed: Aug. 11, 1977

[30] Foreign Application Priority Data

Aug. 20, 1976 [DE] Fed. Rep. of Germany ....... 2637466

[51] Int. Cl.² ................................................ G01F 1/82
[52] U.S. Cl. .................................... 73/228; 261/50 A
[58] Field of Search ............... 73/228, 116; 261/50 A; 123/139 AW

[56] References Cited

U.S. PATENT DOCUMENTS 1,712,761  5/1929  Furnivall et al. ...................... 73/228
3,452,169  6/1969  Ruxton ............................. 73/228 X Primary Examiner—Jerry W. Myracle
Attorney, Agent, or Firm—Edwin E. Greigg

[57] ABSTRACT

A flow meter for metering the air quantity aspirated by an internal combustion engine including a metering valve element constructed as a box-like cylindrical segment pivotably mounted in a flow tube of the engine. The valve element has a radial transverse wall oriented transversely relative to the direction of the air stream in the flow tube, side walls oriented parallel relative to the direction of the air stream and a curved cylinder wall connected to the radial transverse wall and the side walls. The transverse, side and curved cylinder walls define a recess which opens in a direction opposing the direction of the air stream. The flow meter thus constructed possesses the advantage of producing a nearly linear characteristic curve.

5 Claims, 4 Drawing Figures

AIR FLOW METER

BACKGROUND OF THE INVENTION

The invention relates to a flow meter, and in particular to a flow meter for metering the air quantity aspirated by an internal combustion engine.

Flow meters are known in which a force directed in opposition to the meter opening force exists, which opposing force leads to a non-linear characteristic flow metering curve due to the vacuum produced by the flow constriction associated with the meter. The flow metering curve defines a relationship between the angular deflection of a metering valve of the flow meter and the throughflow quantity of the medium passing the flow meter.

The non-linear characteristic referred to is undesirable, so that corrective measures to produce linearization would be desirable.

OBJECT AND SUMMARY OF THE INVENTION

It is, therefore, a principle object of the invention to provide a flow meter of the type disclosed above in which the non-linear characteristic noted above is effectively corrected.

This object is achieved by the provision of a flow meter comprising a metering valve constructed as a box-like cylindrical segment open in the direction opposing the air flow, with the metering valve including a radial transverse wall oriented transversely relative to the direction of flow.

The flow meter preferably also comprises a baffle plate guide located upstream of the metering valve and including a section extending into the segment opening.

Such a flow meter possesses the advantage of producing a nearly linear characteristic curve.

DESCRIPTION OF THE PREFERRED EMBODIMENT

Figure 1:
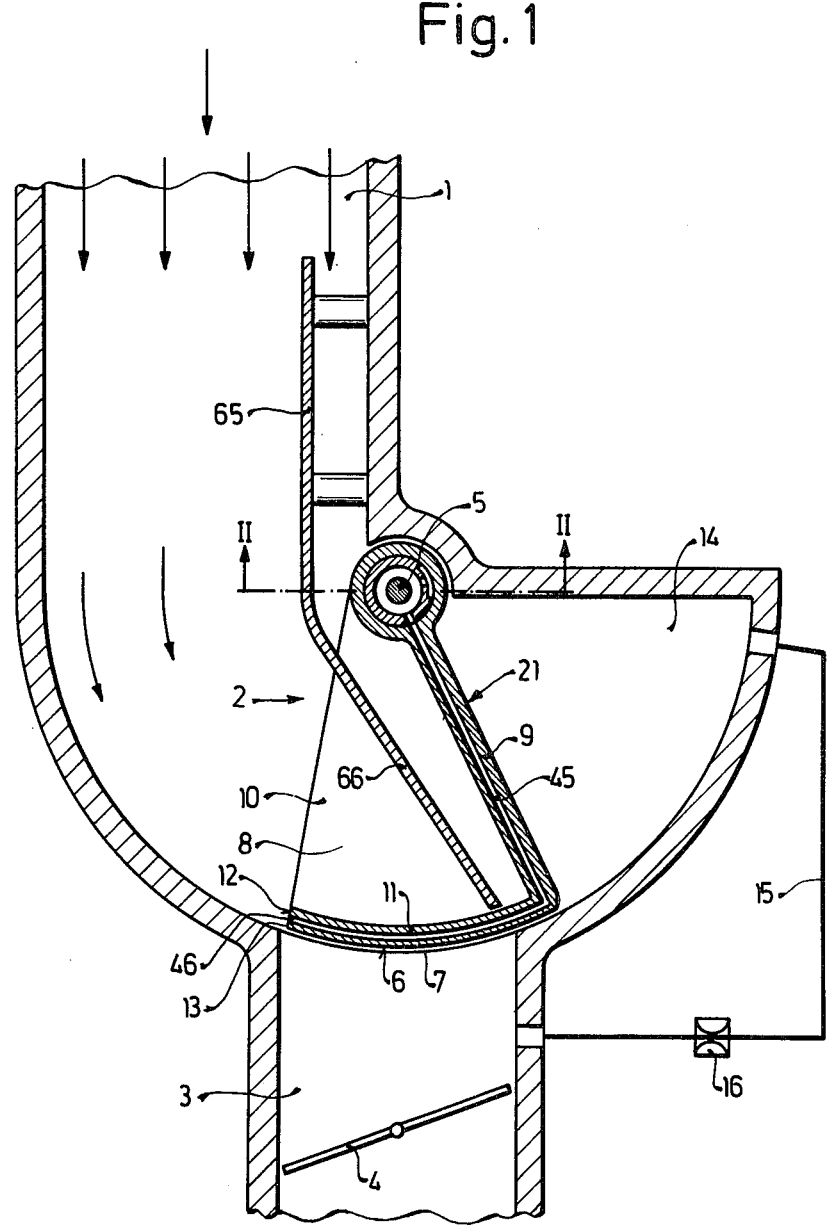
FIG. 1 is a cross sectional view taken along the line I—I of FIG. 2 and illustrates details of the flow meter according to the invention.

Turning to FIG. 1, there is shown a flow meter 2 which serves for metering the air quantity aspirated by an internal combustion engine. The flow meter is located, for example, in the air intake tube of the engine. The combustion air flows in the direction of the arrows within a section 1 of the air intake tube, past the flow meter 2 and then through a section 3 of the intake which contains an arbitrarily pivotal throttle valve 4 to one or several cylinders (not shown) of the engine. The flow meter 2 includes a valve element 21 pivotably mounted on a stationary bearing axle 5. The axle 5 is oriented transversely relative to the longitudinal axis of the air intake tube. The valve element 21 is constructed as a rotary slider in the form of a box-like cylindrical segment transversely penetrating the air intake tube. The cylindrical segment presents a face surface 6 remote from the axle 5, and this face surface sweeps past an aperture 7 leading into the section 3 of the air intake tube. The box-like segment is open on the side opposing the direction of flow and defines a recess 8 terminating in a radial transverse wall 9, oriented transversely relative to the flow direction. The recess 8 is also defined by side walls 10 oriented in the plane of the flow direction, and with a curved wall 11 bounded by the surface face 6. An edge 12 facing the air flow opens the aperture 7 defining the cross-sectional area of the air intake tube more or less as a dependent function of the aspirated air quantity by means of its control edge 13 remote from the fixed axle or shaft 5.

The valve element 21 penetrates the air intake tube section 1 with a narrow radial circumferential clearance. The transverse wall 9 of the valve element 21 during an opening motion thereof swings into a damping chamber 14 connected with the air intake tube section 3 downsteam of the aperture 7 via a line 15 containing a damping throttle 16. This achieves the result that suction tube pressure fluctuations evoked by the suction strokes have practically no influence upon the given angular position of the valve element 21. Thus, the valve element 21 moves within the correspondingly fitted induction tube 1 according to a nearly linear function of the air quantity flowing through the induction tube, wherein for a constant air pressure prevailing upstream of the valve element 21, the pressure prevailing between the valve element 21 and the throttle valve 4 likewise remains constant. As shown in the drawings, (FIG. 2), the valve element 21 can be one of the elements of a fuel injection system and can serve for the direct actuation of a fuel apportioning valve.

Figure 2:
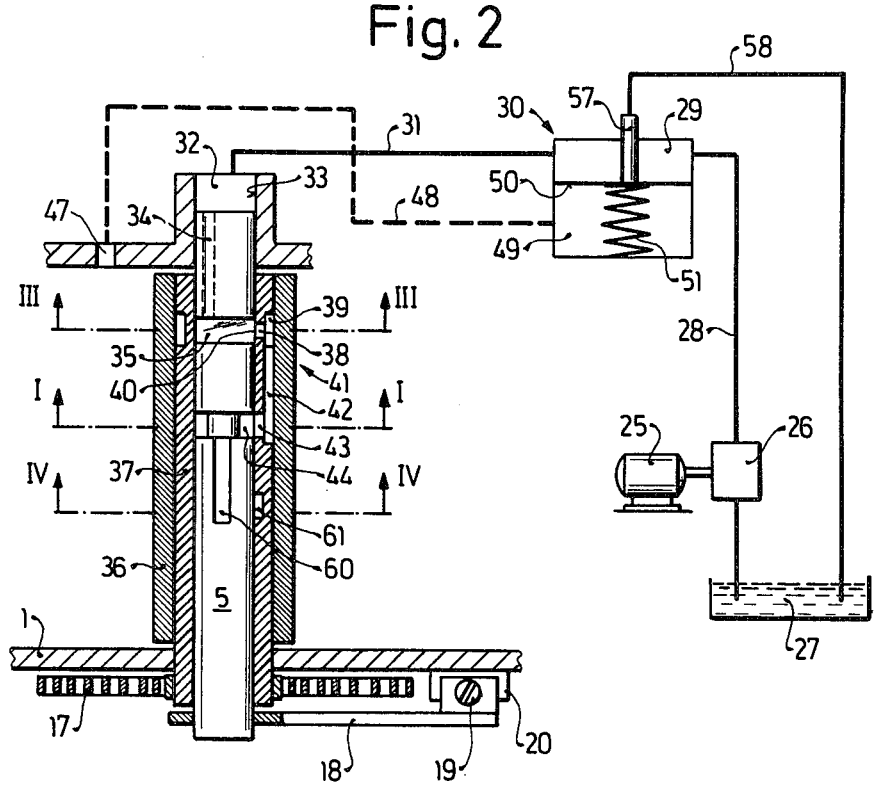
FIG. 2 is a partial cross sectional view taken along the line II—II of FIG. 1 with further details of the fuel supply and control system used with the flow meter of the invention.
Figure 3:
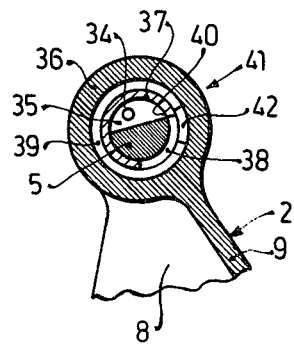
FIG. 3 is a cross sectional view taken along the line III—III of FIG. 2.

Turning now to FIG. 2, it will be seen that fuel is supplied to the system by a fuel pump 26 driven by an electric motor 25. The pump 26 aspirates fuel from a fuel container 27 and delivers it via a line 28 to a chamber 29 within a pressure control valve 30. From the chamber 29, fuel flows through a line 31 into a chamber 32 which is defined by the end face of the fixed shaft 5 and its guide bore 33 in an extension of the induction tube wall. A bore 34, shown in broken lines in FIG. 2, establishes communication of the chamber 32 with a notch 35 machined into the fixed shaft 5. The wall 9 is formed integrally at one end with a sleeve 36 which is fixedly attached to a bushing 37 rotating on the fixed shaft 5. The bushing 37 has a control slot 38 machined therein, which terminates in an annular groove 39. The control slot 38 cooperates with a control edge 40 (see FIG. 3) which is formed by the end surface of the notch 35 in the bearing shaft 5. Depending on the position of the valve element 21, the control edge 40 opens the control slot 38 to varying degrees for metering out a fuel quantity proportional to the aspirated air flow rate. Thus, the control edge 40 and the control slot 38 together form a fuel metering valve 41 within the fixed shaft 5 of the valve element 21. The metered fuel flows from the annular groove 39 through a groove 44 in the fixed shaft 5. The annular groove 44 communicates with a line 44 (FIG. 1) disposed within the face portion of the valve element 21 and the line 45 opens in the vicinity of the aperture-controlling edge 12, e.g. at the end face of the valve element 21, through an injection nozzle 46, into the portion of the passage 7 opened by the face 6, as best seen in FIG. 1.

Fuel is metered out at the metering valve 41 at a constant pressure differential. For this purpose a chamber 49 separated from a chamber 29 of the pressure control valve 30 by a diaphragm 50 is connected by a line 48 on bore 47 with the induction tube section 1 upstream of the valve element 21. The pressure control valve 30 is urged to close by a spring 51 within the chamber 49. The force of the spring 51 may be changed in dependence on operational parameters of the engine. This can be accomplished, for example, by an electromagnet, not shown, which acts on the spring 51. Also, a supplementary force functionally dependent on known operating characteristics alternatively can act directly upon the diaphragm 50, in parallel with the spring 51. The pressure control valve 30 is embodied as a flat seat valve whose diaphragm 50 is its movable valve member which cooperates with a fixed valve seat 57 over which fuel may flow into a return line 58 which terminates in the fuel container 27. The pressure control valve serves at the same time as a system pressure control valve. The excursion of the valve element 21 takes place in opposition to the force of a spiral spring 17, one end of which is connected to the bushing 37 while the other end is attached to a stop member on the air induction tube.

The basic setting of the fuel metering valve 41 may be adjusted by rotating the fixed shaft 5 with respect to the valve element 21 by means of a lever 18 and a screw 19 abutting a stop 20.

Figure 4:
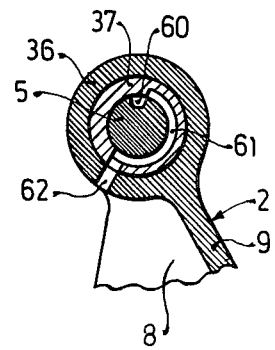
FIG. 4 is a cross sectional view taken along the line IV—IV of FIG. 2.

A favorable feature of the invention is that the metered-out fuel is mixed with air prior to injection in the air induction tube. For this purpose, as shown more clearly in FIG. 4, the annular groove 44 communicates with an air hole 62 in the face 8 via a groove 60 and an annular groove 61. The air hole 62 leads to the interior of the air induction tube 1 upstream of the valve element 21. The annular groove 61 is preferably so embodied that it covers the groove 60 only when the engine runs at least at minimum idling rpm. This feature prevents the admission of an incombustible fuel-air mixture during engine start up. The same purpose could be achieved by placing the terminus of the injection nozzle 46 a small distance upstream of the edge 12 or by placing it so as to be very close to the induction tube wall. The admixture of air to the metered fuel prior to injection in the induction tube results in an improved mixture preparation.

The valve element 21 includes a recess 8 that is directed upstream thus providing a nearly linear characteristic quantity metering curve; e.g. a nearly linear relationship exists between the angular deflection of the valve element 21 and the air quantity throughflow since the flow stagnates in the recess 8, so that pressure upstream of the valve element can build up unhindered. In contrast thereto, a force directed in opposition to the opening force that acts on the valve element will also act on a corresponding valve element closed on all sides, wherein the opposing force is caused by the subpressure evoked as a result of the flow constriction at the aperture, and in turn, produces a non-linear characteristic quantity metering curve.

The linearity of the characteristic quantity metering curve can be improved by means of the placement of a sheet metal guide means 65 into the induction tube section 1 upstream of the valve element 21. The sheet metal guide means 65 is installed with a predetermined side clearance between it and the air intake tube wall, and it containes a section 66 which is arranged to extend into the recess 8 of the valve element 21 and thus form as small a gap as possible, in particular one under 1 millimeter, between it and the bounding walls of the recess 8. The wall 66 of the sheet metal guide 65 is arranged in such a manner as to be near the transverse wall 9 as shown when the valve element is in its position at rest, and arranged so as not to effect a throttling of the air flow in the induction when the valve element is fully opened. The flow influence effects which would be detrimental to the linearity of the characteristic quantity metering curve are largely avoided by means of the utilization of the sheet metal guide 65.

What is claimed is:

1. A flow meter for metering the air quantity aspirated by an internal combustion engine through an air flow tube, the flow tube defining an air stream which is directed as the aspirated air quantity into the engine comprising:
    (a) a metering valve element constructed as a box-like cylindrical segment pivotably mounted in the flow tube in opposition to a restoring force and transversely relative to the direction of the air stream; and
    (b) means connected to the valve element for providing the restoring force to the valve element, and wherein:
        (i) the box-like cylindrical segment includes: a radial transverse wall oriented transversely relative to the direction of the air stream; side walls oriented parallel relative to the direction of the air stream; and a curved cylinder wall connected to the radial transverse wall and the side walls, said walls defining a recess which opens in a direction opposing the direction of the air stream; and
        (ii) the deflection of the valve element against the restoring force represents a measure of the air quantity flowing through the flow tube.

2. The flow meter as defined in claim 1, further comprising:
    (c) a baffle plate guide located in the flow tube upstream of the valve element, said baffle plate guide having a section which extends into the recess.

3. The flow meter as defined in claim 2, wherein the baffle plate guide section which extends into the recess forms as small a gap as possible with the inner surfaces of the side walls and curved cylinder wall of the valve element.

4. The flow meter as defined in claim 3, wherein the gap is less than 1 millimeter.

5. The flow meter as defined in claim 3, wherein the baffle plate guide section which extends into the recess is oriented in such a manner as to be near the transverse wall when the valve element is in its rest position.

* * * * *